US008108155B2

(12) United States Patent
Sandvad et al.

(10) Patent No.: US 8,108,155 B2

(45) Date of Patent: Jan. 31, 2012

(54) SYSTEM FOR MONITORING A RESTORATION FACTOR OF A WIND TURBINE POPULATION

(75) Inventors: Ingemann Hvas Sandvad, Ringkøbing (DK); Cher Ming Tan, Singapore (SG); Pey Yen Siew, Singapore (SG); Yee Soon Tsan, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/003,538

(22) PCT Filed: Jul. 11, 2008

(86) PCT No.: PCT/SG2008/000248

§ 371 (c)(1), (2), (4) Date: Apr. 22, 2011

(87) PCT Pub. No.: WO2010/005393

PCT Pub. Date: Jan. 14, 2010

(65) Prior Publication Data

US 2011/0191033 A1 Aug. 4, 2011

(51) Int. Cl.
*G01B 5/00* (2006.01)

(52) U.S. Cl. .................. 702/33; 702/3; 702/60; 702/61; 702/104; 290/44; 290/55; 73/170.08; 73/170.16; 700/286; 700/287

(58) Field of Classification Search ................ 702/3, 33, 702/60, 104, 61, 187, 188; 290/2, 44, 55; 73/170.08, 170.16; 700/286, 287
See application file for complete search history.

(56) References Cited

U.S. PATENT DOCUMENTS 4,155,252 A * 5/1979 Morrill ..................... 73/170.08
7,392,114 B2 * 6/2008 Wobben ..................... 700/286
7,425,771 B2 * 9/2008 Rivas et al. ..................... 290/44
7,523,001 B2 * 4/2009 Morjaria et al. ..................... 702/3
7,560,823 B2 * 7/2009 Schellings ..................... 290/44
7,606,638 B2 * 10/2009 Fortmann et al. ............. 700/287
7,677,869 B2 * 3/2010 Martinez De Lizarduy Romo et al. ..................... 416/37
7,908,035 B2 * 3/2011 Kumar et al. ................. 700/286
7,952,215 B2 * 5/2011 Hayashi et al. ................. 290/44

(Continued)

FOREIGN PATENT DOCUMENTS

GB 2 405 492 3/2005

(Continued)

OTHER PUBLICATIONS

International Search Report and Written Opinion, International PCT Application No. PCT/SG2008/000248, Mar. 19, 2010.

(Continued)

*Primary Examiner* — Carol Tsai

(74) *Attorney, Agent, or Firm* — Wood, Herron & Evans, L.L.P.

(57) ABSTRACT

A system for monitoring the quality of maintenance performed on a wind turbine. A restoration factor is used to determine the quality of maintenance performed of the wind turbine. A restoration factor determined after a scheduled maintenance is compared to historical and comparative references to determine the quality of the maintenance performed on the wind turbine. Based upon these comparisons, maintenance of the wind turbine may be modified to increase the capacity of the wind turbine.

24 Claims, 5 Drawing Sheets

500
Start
505 Install wind turbine generator
510 Collect data for parameters in response to installation
515 Determine and store initial capability index
520 Set capability index to current capability index
525 Perform maintenance
530 Collect data for parameters in response to maintenance
535 Determine current capability index
545 Calculate comparative restoration factor
550 Calculate historical restoration factor
555 Modify next scheduled maintenance

U.S. PATENT DOCUMENTS

| | | | | |
|---|---|---|---|---|
| 2002/0029097 | A1* | 3/2002 | Pionzio et al. | 700/286 |
| 2004/0230377 | A1* | 11/2004 | Ghosh et al. | 702/3 |
| 2008/0112807 | A1* | 5/2008 | Uphues et al. | 416/1 |
| 2008/0284172 | A1* | 11/2008 | Nielsen | 290/44 |
| 2009/0021013 | A1* | 1/2009 | Andresen | 290/44 |
| 2010/0021298 | A1* | 1/2010 | Sandvad | 416/1 |
| 2010/0066087 | A1* | 3/2010 | Hayashi et al. | 290/44 |
| 2010/0183440 | A1* | 7/2010 | Von Mutius et al. | 416/1 |
| 2011/0144949 | A1* | 6/2011 | Siew et al. | 702/184 |

FOREIGN PATENT DOCUMENTS

| | | |
|---|---|---|
| WO | WO 2008/006020 | 1/2008 |

OTHER PUBLICATIONS

International Preliminary Report on Patentability, issued in corresponding International Application No. PCT/SG2008/000248.

* cited by examiner

SYSTEM FOR MONITORING A RESTORATION FACTOR OF A WIND TURBINE POPULATION

FIELD OF THE INVENTION

This invention relates to determining the quality of maintenance of a wind turbine. More particularly, this invention relates to calculating a restoration factor for a wind turbine after maintenance is performed and comparing the restoration factor to a reference restoration factor to determine the quality of the maintenance performed.

SUMMARY OF THE PRIOR ART

As the world has looked for alternative energy sources to replace fossil fuel, one solution has been the use of wind turbines to generate electrical power. One problem with the use of wind turbines for power generation is maintaining the turbines to prevent power disruptions due to failure of the components in the turbines. Wind turbines are often situated in remote areas to take advantage of prevalent weather patterns in the area. In these remote areas, the wind turbines are often exposed to extreme environmental conditions. These extreme environmental conditions include, but are not limited to, extreme temperatures, rain, snow, blowing debris, and rough seas.

There are two problems associated with placement of wind turbines in these remote locations. The first is the aforementioned extreme environmental conditions. These conditions may cause premature failure of components in a turbine. The second problem is that inspection and maintenance of the wind turbines is difficult and often times expensive to complete. Currently, there is no way to determine the quality of the maintenance performed other than a subsequent on-site inspection of the wind turbine. Therefore, those skilled in the art are constantly striving to find ways to determine the quality of maintenance performed to reduce maintenance-induced-defects that contribute to the need for on-site inspections of wind turbines.

SUMMARY OF THE INVENTION

The above and other problems are solved and an advance in the art is made by a system for monitoring a restoration factor of a wind turbine in accordance with the present invention. A system in accordance with this invention may determine a restoration factor from data already measured by a monitoring system receiving data from sensors already installed in the turbine. This allows for monitoring the effectiveness of the maintenance on the turbine without additional components and remotely from the turbine.

In accordance with this invention, a restoration factor is used to determine the quality of maintenance performed in a wind turbine in the following manner. First, data points for particular parameters of a wind turbine are collected from sensors in a wind turbine for a specified period of time after installation. A reference capability index is calculated from these data points of the parameters. This calculated capability index is stored as a reference capability index. Then, after each scheduled maintenance is performed on the wind turbine, a second set of data points is collected for each of the parameters for the specified time period in response to performing the maintenance. A capability index is then determined from the second set of data points. A restoration factor and/or historical restoration factor are determined from the current capability index. The quality of the maintenance of the wind turbine is then determined based the restoration factor and/or historical restoration factor calculated. Depending on the determined quality of the performed maintenance, the maintenance performed during the next scheduled maintenance of the wind turbine may be modified in some embodiments. Furthermore, the current capability index is then stored for use as the reference capability index for use in determining the quality of the next scheduled maintenance in some embodiments.

BRIEF DESCRIPTION OF THE DRAWINGS

The above features and advantages are described in the following Detailed Description and are shown in the following drawings.

DETAILED DESCRIPTION

This invention relates to determining the quality of maintenance of a wind turbine. More particularly, this invention relates to calculating a restoration factor for a wind turbine after maintenance is performed and comparing the restoration factor to a reference restoration factor to determine the quality of the maintenance performed.

This invention relates to a manner of providing a metric for determining the quality of maintenance performed on wind turbine. By using the metric to determine quality of the maintenance on the turbine, the chances of maintenance induced defects can be reduced. In accordance with this invention, a restoration factor is used as a metric of the quality of the maintenance performed on the turbine. The restoration factor is a ratio of the current state of the parameter(s) versus a historic or previous state of the parameter(s). Thus, a restoration factor is determined by the following formula:

$$\text{Restoration Factor} = \frac{P_{(k+1)}}{P_{(k)}}$$

where k+1 is the number of the scheduled maintenance being evaluated and k is the previous scheduled maintenance and P is the capability index of the maintenance.

The capability index is determined from measured parameters of the wind turbine. Some examples of the parameters that may be used to determine the restoration factor include, but are not limited to, power output, toque, input/output current, and input/output voltage. A combination of parameters may be used in a formulaic manner to determine the capability index. One example of calculating a capability index is applying the six sigma terminology, for example Cpk to the parameters.

Ideally, the restoration factor after scheduled maintenance is approximately 1. In other words, the maintenance restores the turbine back to its original capability. However, in operation, the restoration factor may be any positive number as shown by the example in FIG. 1.

Typically, the data for the capability index and in turn the restoration factor is collected for a specified time after a scheduled maintenance. A restoration factor may be determined in two manners, historical and comparative. In a historical use, the current capability index is compared to the initial or historical capability indexed determined from the parameters measured immediately after the wind turbine is commissioned or installed. For these calculations, the historical restoration factor show the quality of the wind turbine after each scheduled maintenance compared to the original capability of the turbine.

Figure 1:
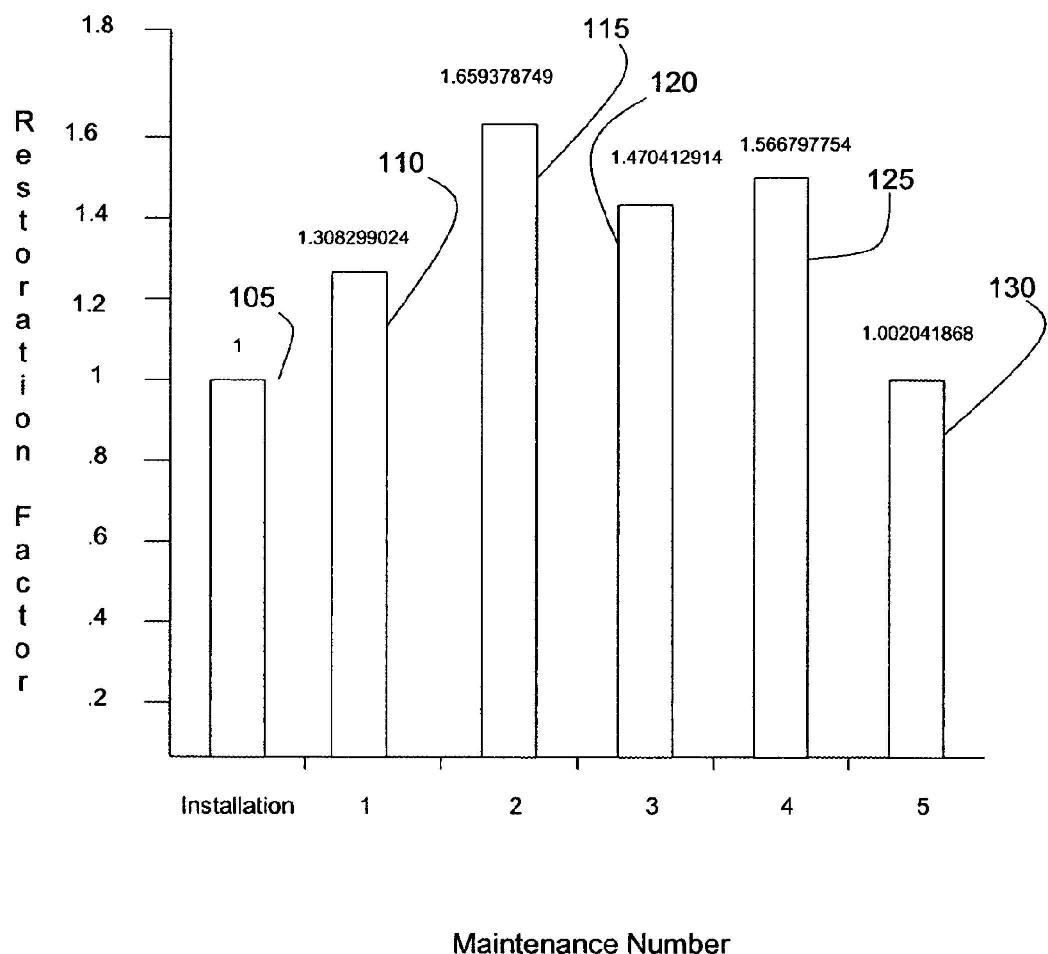
FIG. 1 illustrating a graph of historical restoration factors of a wind turbine as calculated in accordance with an embodiment of this invention.

FIG. 1 illustrates a bar graph of the historical restoration values for a wind turbine from installation until after the fifth scheduled maintenance. Bar 105 indicates the capability of the wind turbine after installation. Capability is set to 1 showing 100% capability of the wind turbine after installation.

Bar 110 indicates that the restoration factor is 1.308299924. This shows that after the first maintenance the wind turbine is operating at approximately 130% of the capability measured after installation. Therefore, the maintenance of the wind turbine has increased the capability of the wind turbine. One skilled in the art can see that no adjustments are needed to the maintenance performed as the maintenance has restored the wind turbine to a greater capability than the wind turbine had after installation.

Bar 115 indicates that the restoration factor is 1.659378749. This shows that after the second maintenance the wind turbine is operating at approximately 165% of the capability measured after installation. Therefore, the maintenance of the wind turbine has again increased the capability of the wind turbine. One skilled in the art can see that no adjustments are needed to the maintenance performed as the maintenance has restored the wind turbine to a greater capability than the wind turbine had after installation.

Bar 120 indicates that the restoration factor is 1.470412914. This shows that after the third maintenance the wind turbine is operating at approximately 147% of the capability measured after installation. Therefore, the maintenance of the wind turbine has increased the capability of the wind turbine relative to the installation. However, the capability of the wind turbine has decreased since the prior maintenance. One skilled in the art can see that adjustments may be needed to the maintenance performed as the maintenance has not restored the wind turbine to the capability of the wind turbine after the last scheduled maintenance. However, the maintenance has maintained the capability of the wind turbine relative to the time of installation. Thus, one skilled in the art may want to determine the cause of the decrease in capability and make some changes in the maintenance performed during the next scheduled maintenance.

Bar 125 indicates that the restoration factor is 1.566797754. This shows that after the fourth maintenance the wind turbine is operating at approximately 157% of the capability measured after installation. Therefore, the maintenance of the wind turbine has again increased the capability of the wind turbine. One skilled in the art can see that no adjustments are needed to the maintenance performed as the maintenance has restored the wind turbine to a greater capability than the wind turbine had at installation and after the last scheduled maintenance.

Bar 130 indicates that the restoration factor is 1.002041868. This shows that after the fifth maintenance the wind turbine is operating at approximately 100% of the capability measured after installation. Therefore, the maintenance of the wind turbine has maintained the capability of the wind turbine relative to the installation. However, the capability of the wind turbine has decreased since the prior maintenance. One skilled in the art can see that adjustments may be needed to the maintenance performed as the maintenance has not restored the wind turbine to the capability of the wind turbine after the last scheduled maintenance. However, the maintenance has maintained the capability of the wind turbine relative the capability measured after installation. Thus, one skilled in the art may want to determine the cause of the decrease in capability and make some changes in the maintenance performed during the next scheduled maintenance.

As can be seen from the above example, a historical restoration factor showing the measured capability of the wind turbine compared to the capability after installation may not give the complete information about the quality of the maintenance performed. Therefore, other embodiments provide a comparative restoration factor that is ratio between capability indexes for a current maintenance and a previous maintenance. The comparative ratio may then be used to determine the quality of the currently performed scheduled maintenance.

A comparative restoration factor compares a current capability index determined from data collected after the current scheduled maintenance with a reference capability index that is determined from data collected after a previously performed scheduled maintenance. Preferably, the previous scheduled maintenance was the maintenance that occurred immediately prior to the current scheduled maintenance. A comparative restoration factor ratio is often used to determine the quality of maintenance or a quality of a replacement part.

Figure 2:
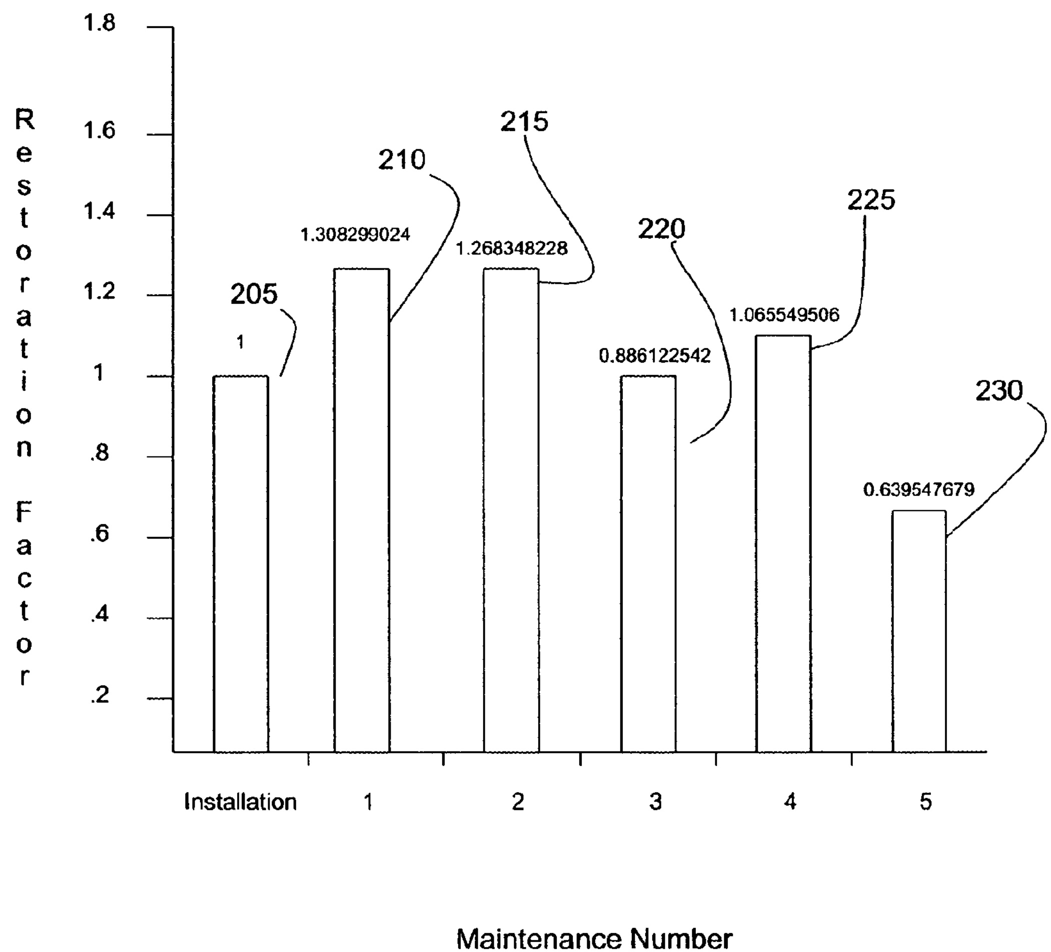
FIG. 2 illustrating a graph of comparative restorations factors of a wind turbine as calculated in accordance with an embodiment of this invention.

FIG. 2 illustrates bar graph of comparative restoration values of a wind turbine after installation and the first five scheduled maintenances. Bar 205 indicates the comparative restoration factor of the wind turbine after installation. Since there is no previous restoration factor to compare with the restoration factor of the installation, the restoration factor is set to 1 showing 100% restoration for the wind turbine after installation.

Bar 210 indicates that the restoration factor is 1.308299924. This shows that after the first maintenance the wind turbine is operating at approximately 130% of the capability measured after installation. Therefore, the maintenance of the wind turbine has increased the capability of the wind turbine. One skilled in the art can see that no adjustments are needed to the maintenance performed as the maintenance has restored the wind turbine to a greater capability than the wind turbine had after installation.

Bar 215 indicates that the restoration factor is 1.268348228. This shows that after the second maintenance the wind turbine is operating at approximately 126% of the measured capability of the wind turbine after the first scheduled maintenance. Therefore, the maintenance of the wind turbine has again increased the capability of the wind turbine. One skilled in the art can see that no adjustments are needed to the maintenance performed as the maintenance has restored the wind turbine to a greater capability than the wind turbine had after the previously performed maintenance.

The comparative restoration factor differs from the historical restoration factor in that the comparative restoration factor only measures the difference in the restoration factor or capability between two scheduled maintenances. For example, the comparative restoration factor by bar 215 shows approximately a 26% increase in capability if measured against the restoration factor of the last maintenance while the capability has risen approximately 65% over the capability of the wind turbine after installation as shown by bar 115 of FIG. 1.

Referring back to FIG. 2, Bar 220 indicates a comparative restoration factor of 0.886122542. This shows that after the third maintenance the wind turbine is operating at approximately 89% of the capability measured after the second scheduled maintenance. Therefore, the third scheduled maintenance of the wind turbine has only partially restored the capability of the wind turbine relative to capability of the wind turbine measured after the second scheduled maintenance. One skilled in the art can see that adjustments may be needed to the maintenance performed as the maintenance has not restored the wind turbine to the capability of the wind turbine after the second scheduled maintenance. Thus, one skilled in the art may want to determine the cause of the decrease in capability and make some changes in the maintenance performed during the next scheduled maintenance.

Bar 225 indicates a comparative restoration factor is 1.065549506. This shows that after the fourth scheduled maintenance the wind turbine is operating at approximately 106% of the capability of the wind turbine measured after the third scheduled maintenance. Therefore, the maintenance of the wind turbine has again increased the capability of the wind turbine. One skilled in the art can see that no adjustments are needed to the maintenance performed as the maintenance has restored the wind turbine to a greater capability than the wind turbine had after the last scheduled maintenance.

Bar 230 indicates a comparative restoration factor is 0.639547679. This shows that after the fifth scheduled maintenance the wind turbine is operating at approximately 64% of the capability of the wind turbine measured after the fourth scheduled maintenance. Therefore, the capability of the wind turbine has decreased since the prior maintenance. One skilled in the art can see that adjustments may be needed to the maintenance performed as the maintenance has not restored the wind turbine to the capability of the wind turbine after the last scheduled maintenance. Thus, one skilled in the art may want to determine the cause of the decrease in capability and make some changes in the maintenance performed during the next scheduled maintenance.

Figure 3:
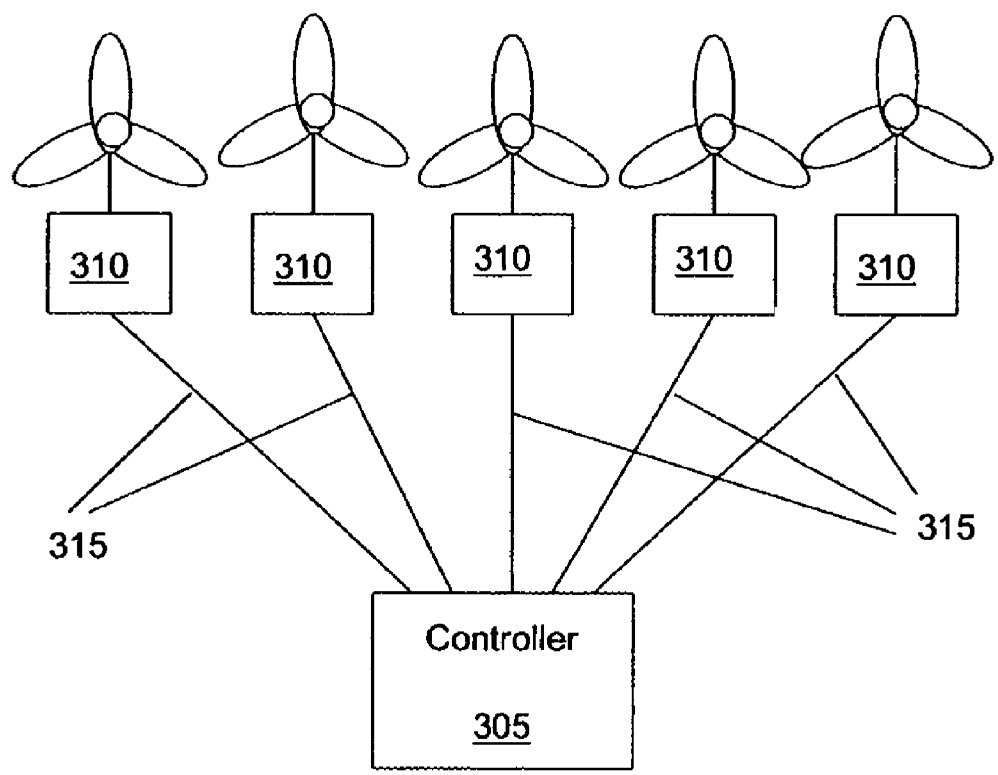
FIG. 3 illustrating a population of wind turbines and a control system in accordance with an exemplary embodiment of this invention.
Figure 4:
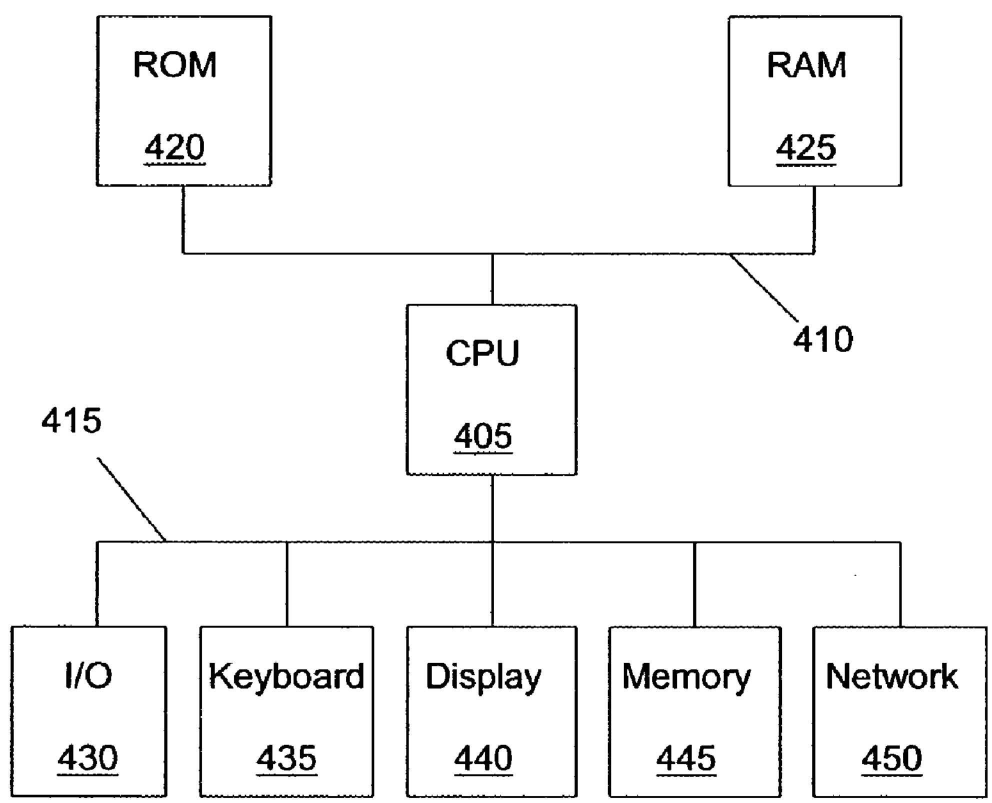
FIG. 4 illustrating a processing system such as one included in the control system and other devices in accordance with an exemplary embodiment of this invention.

FIGS. 3 and 4 illustrate typically components in which components that monitor restoration factors may be incorporated in accordance with this invention. FIG. 3 illustrates an example of a population 300 that incorporates a restoration monitoring system for each wind turbine in accordance with this invention. Population 300 includes wind turbines 310 that are situated in a wind park proximate one another or within the same geographical area or in similar environments. Wind turbines 310 are conventional wind turbines for power generation and the exact components of the individual turbines are inconsequential to the present invention and therefore omitted for brevity. Although this example has a population that transmits signal from remote areas to a central location, it is envisioned that other failure reporting methods may be used including but not limited to a human technician inputting a report of a failure into the system.

Each wind turbine 310 transmits signals over a connection 315 to a system controller 305. Connection 315 may be any transmission medium including but not limited to Radio Frequency (RF), Infrared (IR), Telephonic, or any other form of communication connection. Each wind turbine 310 includes monitoring devices that measure a property of either the wind turbine, a component of the wind turbine, or a sub-component of the component of the wind turbine. For purposes this discussion, components may include, but are not limited to gearboxes, and generators; sub components may include, but are not limited to, brushes, slip rings, and motor systems; and properties may include, but are not limited to, power output, torque, and revolutions per minute. Each property can be used to measure the condition of a component or subcomponent. In some embodiments, the signal may be simple failure signal or a message indicating failure of the component. In other embodiments, the signal may be a message transmitting data for the property measured by the monitor. Furthermore, the protocol in which data is transmitted over connection 315 is not important to this invention and is left as a design choice.

The signal is then transmitted via connection 315 to system controller 305. System controller 305 is processing system that is located either at or in the population or at some facility remote from the population of wind turbines 310. The precise location of system controller 305 is not important to the operation of the system and is left as a design choice for those skilled in the art.

FIG. 4 illustrates a processing system 400 representative of system controller 405 and includes the components of a processing system needed to perform the processes of a system in accordance with this invention. One skilled in the art will recognize that the exact components of the system are left to those skilled in the art designing a system in accordance with this invention and that other components that perform the same functions may be used without departing from the system in accordance with this invention. Furthermore, one skilled in the art will recognize that other embodiments that include the processes embodied in software, firmware or hardware are possible without departing from this invention.

Processing system 400 includes Central Processing Unit (CPU) 405. CPU 405 is a processor, microprocessor, or any combination of processors and microprocessors that execute instructions to perform the processes in accordance with the present invention. CPU 405 connects to memory bus 410 and Input/Output (I/O) bus 415. Memory bus 410 connects CPU 405 to memories 420 and 425 to transmit data and instructions between the memories and CPU 405. I/O bus 415 connects CPU 405 to peripheral devices to transmit data between CPU 405 and the peripheral devices. One skilled in the art will recognize that I/O bus 415 and memory bus 410 may be combined into one bus or subdivided into many other busses and the exact configuration is left to those skilled in the art.

A non-volatile memory 420, such as a Read Only Memory (ROM), is connected to memory bus 410. Non-volatile memory 420 stores instructions and data needed to operate various sub-systems of processing system 400 and to boot the system at start-up. One skilled in the art will recognize that any number of types of memory may be used to perform this function.

A volatile memory 425, such as Random Access Memory (RAM), is also connected to memory bus 410. Volatile memory 425 stores the instructions and data needed by CPU 405 to perform software instructions for processes such as the processes for providing a system in accordance with this invention. One skilled in the art will recognize that any number of types of memory may be used to provide volatile memory and the exact type used is left as a design choice to those skilled in the art.

I/O device 430, keyboard 435, Display 440, memory 445, network device 450 and any number of other peripheral devices connect to I/O bus 415 to exchange data with CPU 405 for use in applications being executed by CPU 405. I/O device 430 is any device that transmits and/or receives data from CPU 405. Keyboard 435 is a specific type of I/O that receives user input and transmits the input to CPU 405. Display 440 receives display data from CPU 405 and display images on a screen for a user to see. Memory 445 is device that transmits and receives data to and from CPU 405 for storing data to a media. Network device 450 connects CPU 405 to a network for transmission of data to and from other processing systems.

Figure 5:
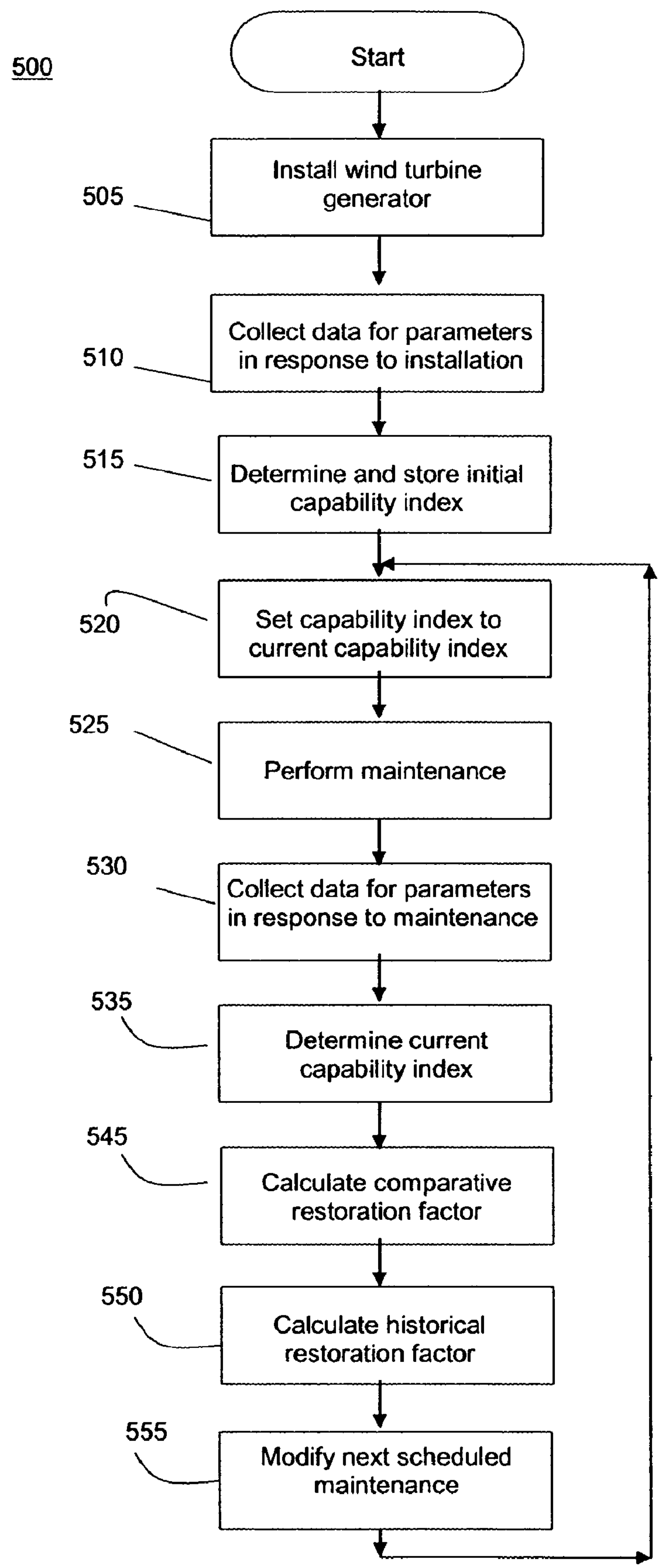
FIG. 5 illustrating a flow diagram of an exemplary embodiment of a monitoring process performed by a control system in accordance with this invention.

FIG. 5 illustrates an embodiment of process for monitoring a restoration factor in accordance with this invention. Process 500 begins in step 505 by installing and/or commissioning a wind turbine in a conventional manner. In step 510, data points for at least one parameter used to determine the capability index are collected in a conventional manner as described with regards to FIG. 3. In step 515, a historical capability index is determined from the data collected in step 510 and stored for future analysis. As stated above, the historical capability index may be calculated by applying the Cpk parameter of six sigma terminology to the measured parameter or parameters.

In step 520, a reference capability index is set equal to a previously determined capability index. In the case immediately after commissioning of the wind turbine, the reference restoration factor is set the historical capability and stored for use. In step 525, a scheduled maintenance occurs. After the scheduled maintenance is performed, data for the specified parameters is again collected in response to the maintenance in step 530.

In step 535, a current capability index is then determined from the data collected in step 530. As stated above, the current capability index may be calculated by applying the Cpk parameter of six sigma terminology to the measured parameter or parameters. A comparative restoration factor for the scheduled maintenance is then calculated by dividing the current capability index by the reference capability index in step 545. A historical restoration factor may then be calculated by dividing the current capability factor by the historical capability factor in step 550.

Based upon the restoration factors calculated in steps 545 and 550, modifications are made to the maintenance to be performed to the wind turbine during the next scheduled maintenance in step 450. Some examples of modification include, scheduling a further maintenance, change the type of components used in the repair, and scheduling inspections of the wind turbine. After step 550, process 500 repeats from step 520.

The above is a detailed description of exemplary embodiments of a supervision system in accordance with this invention. It is envisioned that those skilled in the art can and will design alternative systems that infringe on this invention as set forth in the following claims.

What is claimed is:

1. A method for determining quality of a scheduled maintenance performed on a wind turbine comprising:
- collecting a first plurality of data points for each of specified parameters of said wind turbine;
- determining a reference capability index from said first plurality of data points of said specified parameters;
- collecting a second plurality of data points for each of said specified parameters of said wind turbine in response to a scheduled maintenance;
- determining a current capability index from said second plurality of data for said specified parameters; and
- calculating a restoration factor from said reference capability index and said current capability index wherein said restoration factor shows a quality of said scheduled maintenance performed on said wind turbine.

2. The method of claim 1 further comprising:
- storing said current capability index for use as said reference capability index for a subsequent calculated restoration factor.

3. The method of claim 1 further comprising:
- collecting an initial plurality of data points for each of said specified parameters in response to installing said wind turbine; and
- determining a historical capability index from said initial plurality of data points for said plurality of parameters.

4. The method of claim 3 further comprising:
- storing said historical capability index in response to determining said historical capability index.

5. The method of claim 3 further comprising:
- calculating a historic restoration factor from said current capability index and said historical capability index responsive to determining said current capability index indicting quality of said scheduled maintenance performed.

6. The method of claim 5 further comprising:
- modifying maintenance to be performed on said wind turbine during a next scheduled maintenance in response to said quality of said schedule maintenance performed on said wind turbine determined from said historical restoration factor.

7. The method of claim 1 further comprising:
- modifying maintenance to be performed on said wind turbine during a next scheduled maintenance in response to said quality of said schedule maintenance performed on said wind turbine determined from said restoration factor.

8. The method of claim 1 wherein said capability index is determined by apply Cpk from Six Sigma terminology to said specified parameters.

9. A product for determining productivity of a wind turbine comprising:
- instructions for directing a processing unit to:
  - collect a first plurality of data points for each of specified parameters of said wind turbine,
  - determine a reference capability index from said first plurality of data points of said specified parameters,
  - collect a second plurality of data points for each of said specified parameters of said wind turbine in response to a scheduled maintenance,
  - determine a current capability index from said second plurality of data for said specified parameters,
  - calculate a restoration factor from said reference capability index and said current capability index wherein said restoration factor shows a quality of said scheduled maintenance performed on said wind turbine; and
  - a non-transitory readable medium by the processing unit containing computer instructions stored therein for causing a computer processor to perform.

10. The product of claim 9 wherein said instructions further comprise:
- instructions for directing said processing unit to store said current capability index for use as said reference capability index for a subsequent calculated restoration factor.

11. The product of claim 9 wherein said instructions further comprise:
- instructions for directing said processing unit to:
  - collect an initial plurality of data points for each of said specified parameters in response to installing said wind turbine; and
  - determine a historical capability index from said initial plurality of data points for said plurality of parameters.

12. The product of claim 11 wherein said instructions further comprise:

instructions for directing said processing unit to:

store said historical capability index in response to determining said historical capability index.

13. The product of claim 11 wherein said instructions further comprise:

instructions for directing said processing unit to:

calculate a historic restoration factor from said current capability index and said historical capability index responsive to determining said current capability index indicting quality of said scheduled maintenance performed.

14. The product of claim 13 wherein said instructions further comprise:

instructions for directing said processing unit to:

modify maintenance to be performed on said wind turbine during a next scheduled maintenance in response to said quality of said schedule maintenance performed on said wind turbine determined from said historical restoration factor.

15. The product of claim 9 wherein said instructions further comprise:

instructions for directing said processing unit to:

modify maintenance to be performed on said wind turbine during a next scheduled maintenance in response to said quality of said schedule maintenance performed on said wind turbine determined from said restoration factor.

16. The product of claim 9 wherein said instructions further comprise:

instructions for directing said processing unit to:

determine said capability index by applying Cpk from Six Sigma terminology to said specified parameters.

17. An apparatus for determining productivity of a wind turbine comprising:

circuitry configured to collect a first plurality of data points for each of specified parameters of said wind turbine, circuitry configured to determine a reference capability index from said first plurality of data points of said specified parameters, circuitry configured to collect a second plurality of data points for each of said specified parameters of said wind turbine in response to a scheduled maintenance, circuitry configured to determine a current capability index from said second plurality of data for said specified parameters, and circuitry configured to calculate a restoration factor from said reference capability index and said current capability index wherein said restoration factor shows a quality of said scheduled maintenance performed on said wind turbine.

18. The apparatus of claim 17 further comprising:

circuitry configured to store said current capability index for use as said reference capability index for a subsequent calculated restoration factor.

19. The apparatus of claim 17 further comprising:

circuitry configured to collect an initial plurality of data points for each of said specified parameters in response to installing said wind turbine; and circuitry configured to determine a historical capability index from said initial plurality of data points for said plurality of parameters.

20. The apparatus of claim 19 further comprising:

circuitry configured to store said historical capability index in response to determining said historical index.

21. The apparatus of claim 19 further comprising:

circuitry configured to calculate a historic restoration factor from said current capability index and said historical capability index responsive to determining said current capability index indicting quality of said scheduled maintenance performed.

22. The apparatus of claim 19 further comprising:

circuitry configured to modify maintenance to be performed on said wind turbine during a next scheduled maintenance in response to said quality of said schedule maintenance performed on said wind turbine determined from said historical restoration factor.

23. The apparatus of claim 17 further comprising:

circuitry configured to modify maintenance to be performed on said wind turbine during a next scheduled maintenance in response to said quality of said schedule maintenance performed on said wind turbine determined from said restoration factor.

24. The apparatus of claim 17 wherein said circuitry configured to determine said current capability index comprises:

circuitry configured to determine said capability index by applying Cpk from Six Sigma terminology to said specified parameters.

* * * * *

UNITED STATES PATENT AND TRADEMARK OFFICE

CERTIFICATE OF CORRECTION

PATENT NO. : 8,108,155 B2
APPLICATION NO. : 13/003538
DATED : January 31, 2012
INVENTOR(S) : Ingemann Hvas Sandvad et al.

It is certified that error appears in the above-identified patent and that said Letters Patent is hereby corrected as shown below:

Title Page

At [57], Line 3, change "of" to --on--.

Column 2

Line 1, after "based" insert --on--.

Line 41, after "on" insert --a--.

Line 62, change "toque" to --torque--.

Column 3

Line 11, change "indexed" to --index--.

Line 14, change "show" to --shows--.

Column 4

Line 20, after "is" insert --a--.

Column 5

Line 65, after "purposes" insert --of--.

Column 6

Line 66, change "display" to --displays--.

Line 67, after "is" insert --a--.

Signed and Sealed this
Seventh Day of August, 2012

David J. Kappos
*Director of the United States Patent and Trademark Office*

Column 7

Line 20, after “set” insert --to--.

Line 39, change “include,” to --include--.

Column 8

Claim 5, line 14, change “indicting” to --indicating--.

Claim 6, line 19, change “schedule” to --scheduled--.

Claim 7, line 25, change “schedule” to --scheduled--.

Claim 8, line 29, change “apply” to --applying--.

Column 9

Claim 13, line 10, change “indicting” to --indicating--.

Claim 14, line 17, change “schedule” to --scheduled--.

Claim 15, line 25, change “schedule” to --scheduled--.

Column 10

Claim 21, line 24, change “indicting” to --indicating--.

Claim 22, line 29, change “schedule” to --scheduled--.

Claim 23, line 35, change “schedule” to --scheduled--.